United States Patent Office 3,336,352
Patented Aug. 15, 1967

3,336,352
BRANCHED CHAIN POLYSILOXANES AND
PROCESS THEREFOR
George M. Omietanski, Tonawanda, N.Y., assignor to Union Carbide Corporation, a corporation of New York
No Drawing. Filed Apr. 29, 1963, Ser. No. 276,172
6 Claims. (Cl. 260—448.2)

This invention relates to branched chain polysiloxanes of specific desired compositions and to a process for their preparation employing a tertiary amine catalyst. More particularly, it relates to the production of branched chain polysiloxanes having superior low temperature properties in addition to having desirable high temperature properties.

Organopolysiloxane fluids are known to possess desirable high temperature properties. Their use at relatively low temperatures has been limited, however, by their relatively high freezing points or crystallization temperatures and high viscosities at low temperatures. Attempts have been made in the prior art to improve the low temperature properties of organopolysiloxane fluids by introducing bulky groups or branches to the regular structure of the organopolysiloxane. This introduction of new groups is generally accomplished by copolymerization of monomer mixtures or equilibration techniques. The resulting branched organosiloxanes prepared by equilibration contain both long and short chains as well as cyclic network components in a random distribution. While these compounds have some improvement in the general low temperature properties, they still leave much to be desired in regard to such properties.

I have now found that branched chain polysiloxanes of specific desired composition having non-random, ordered structure can be prepared which have superior low temperature properties, such as lower pour points or freezing points and lower viscosities than linear siloxanes of the same weight average molecular weight. Such materials also have high temperature properties which are equal to or better than those of linear organosiloxanes of the same bulk viscosity. These novel branched organosiloxanes have the generic formula:

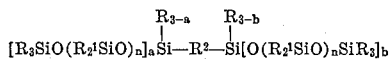

wherein R and $R^1$ are monovalent hydrocarbyl radicals, $n$ is a number having a value of 0 to 21 inclusive, $R^2$ is a divalent hydrocarbyl radical selected from the class consisting of alkylene radicals and arylene radicals, $a$ is an integer having a value of 0 to 3 inclusive, $b$ is an integer having a value from 0 to 3 inclusive, and the sum of $a+b$ is 3 to 6 inclusive. Preferably, $n$ is a number having a value of 1 to 6 inclusive, R and $R^1$ radicals are methyl radicals, $R^2$ is selected from the class consisting of —CH$_2$CH$_2$— and —C$_6$H$_4$— radicals, and $a$ and $b$ each have a value of 3.

The monovalent hydrocarbyl radicals which are represented by R and $R^1$ in the above formula are illustrated by alkyl groups, such as methyl, ethyl, propyl, isopropyl, butyl, isobutyl, amyl, hexyl and the like; alkenyl groups, such as vinyl, allyl and the like; alicyclic groups, such as cyclopentyl, cyclohexyl and the like; aryl groups, such as phenyl, naphthyl and the like; aralkyl groups, such as benzyl, phenylethyl and the like; and alkaryl groups, such as tolyl, ethylphenyl, xylyl, mesityl and the like. R and $R^1$ can be the same or different radicals. The divalent hydrocarbon radicals which are represented by $R^2$ in the above formula are illustrated by lower alkylene groups such as

—CH$_2$—, —CH$_2$CH$_2$—, —CH$_2$CH$_2$CH$_2$—, —CH$_2$CH(CH$_3$)— and the like, and arylene groups, such as phenylene (—C$_6$H$_4$—), naphthylene (—C$_{10}$H$_6$—) and the like.

The branched polysiloxanes of the present invention having superior low temperature properties can be obtained preferably by a novel process. This process comprises reacting an organosiloxanol having the formula: $R_3SiO(R_2^1SiO)_nH$ with an organosilicon compound selected from the class consisting of silanes having the formula: $R^3SiX_3$ and bis(silyl) compounds having the formula:

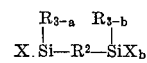

in the presence of a tertiary amine, wherein R, $R^1$, $R^2$, $a$ and $b$ are defined above, $n$ is a number having a value from 1 to 21 inclusive, $R^3$ is a monovalent hydrocarbyl radical or substituted monovalent hydrocarbyl radical, and X is selected from the class consisting of chloro, secondary amino and acyloxy radicals. The monovalent hydrocarbyl radicals which are represented by $R^3$ in the above formula $R^3SiX_3$ are selected from the monovalent hydrocarbyl radicals described above for R and $R^1$ radicals. The substituted monovalent hydrocarbyl radicals which are represented by $R^3$ in the above formula contain chloro, dialkylamino or cyano substituents located at least two carbon atoms from the silicon atom. Such radicals are illustrated by gamma-chloropropyl, gamma-cyanopropyl, delta-(N,N-dimethylamino)butyl and the like. The secondary amino radicals which are represented by X in the above formulas are illustrated by dimethylamino, diethylamino, piperidinyl and the like. The acyloxy radicals which are represented by X in the above formula are illustrated by acetoxy, propionoxy, butyroxy, benzoxy and the like. When

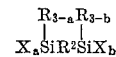

is used as a reactant in the above process, the product has the formula

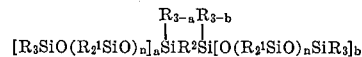

When $R^3SiX_3$ is used as a reactant in the above process, the product has the formula

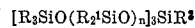

The latter type product is referred to as a "Star" polymer. Such Star polymers are disclosed and claimed in my application Ser. No. 276,170 filed concurrently herewith.

Tertiary amines useful in this process are illustrated by trimethylamine, triethylamine, triphenylamine, methyldiethylamine, pyridine, methylethylphenylamine, 3-picoline and the like. Tertiary amines are the preferred catalysts for this reaction since they do not react with the reactants as might ammonia, primary and secondary amines. The tertiary amines prevent undesirable side reactions and allow specific desired products to be obtained. Ammonia can be used, if desired, in the later stages of the reaction to drive it to completion. The tertiary amine is present in the reaction mixture in an amount of at least one mole of amine for each mole of organosiloxanol reactant. Preferably, the amine is present in excess of one mole for each mole of organosiloxanol reactant.

Inert organic solvents, such as acetone, benzene, xylene and tetrahydrofuran, are preferably also used in the above process to aid in the formation of the specific desired products. The process conditions are not narrowly critical. The reaction can be carried out in the temperature range of about 0° C. to about 150° C. The preferred temperature range is from about 25° C. to about 100° C.

The reactants in the above process are prepared by well-known procedures. The $R_3SiO(R_2^1SiO)_nH$ compounds are prepared by hydrolysis of $R_3SiO(R_2^1SiO)_nAc$ in the presence of an acid acceptor such as ammonium hydroxide. Ac designates an acyl radical, such as acetyl, propionyl, benzoyl and the like, and R, $R^1$ and $n$ are defined above. The $R^3SiX_3$ compounds wherein X is chloro can be prepared by reaction between organochlorides and silicon, $R^3$ is defined above. When X is secondary amino, the compound is formed by reaction between $R^3SiCl_3$ and excess secondary amine. When X is acyloxy, the compound is formed by reaction of $R^3SiCl_3$ with an acyl anhydride. The

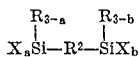

type compounds are formed, for example, by reaction between benzene, $R_{3-a}SiHX_a$ and $R_{3-b}SiHX_b$ when $R^2$ is arylene and by reaction between $R_{3-a}SiHX_a$ and

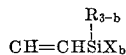

when $R^2$ is alkylene. The preferred $X_3SiR^2SiX_3$ type starting material compounds are thus prepared by reaction between excess trichlorosilane and benzene when $R^2$ is —$C_6H_4$— and by reaction between trichlorosilane and vinyltrichlorosilane when $R^2$ is —$CH_2CH_2$—.

The invention is described in further detail in the following examples. Me designates a methyl "$CH_3$" radical.

Example I

In a 500 ml., 3-necked flask equipped with a stirrer, addition funnel and gas inlet tube were placed phenyltrichlorosilane (60 g.) and triethylamine (95 g.). The compound $Me_3SiO(Me_2SiO)_3H$ (270 g.) was then slowly added over a period of 0.5 hour from the addition funnel. After cooling, the reaction mixture was quenched into distilled water, the siloxane layer was separated, dried over anhydrous calcium sulfate and fractionated. The clear, colorless fluid product,

had the properties of B.P. 178° C./0.08 mm. Hg, $n_D^{25}=1.4162$. It was obtained in a 44 mole percent yield based on moles of reactants. Calculated for $C_{33}H_{86}O_{12}Si_{13}$: 38.2% C, 8.3% H, 35.1% Si, molar refraction ($MR_D$)=273.8, molecular weight=1038. Found: 38.3% C, 8.2% H, 35.1% Si, $MR_D$=274.0, molecular weight=1032.

Example II

The reaction of $Cl_3SiCH_2CH_2SiCl_3$ (27 g.) with an excess of $Me_3SiO(Me_2SiO)_3H$ (172.5 g.) in the presence of triethylamine (60.8 g.) gave after washing, drying and devolatilization about a 50 mole percent yield of

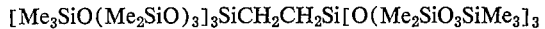

This fluid was obtained as a clear, light green liquid having refractive index of $n_D^{25}=1.4075$. Calculated for $C_{56}H_{166}O_{26}Si_{26}$: 34.4% C, 8.5% H, 37.4% Si, $MR_D$=505.8; molecular weight=1951. Found: 34.2% C, 8.5% H, 37.0% Si, $MR_D$=505.3, molecular weight=1734.

Example III

The reaction of m-$Cl_3SiC_6H_4SiCl_3$ (31.3 g.) with an excess of $Me_3SiO(Me_2SiO)_3H$ (171.4 g.) in the presence of triethylamine (61.1 g.) gave after washing, drying and devolatilization about a 54.5 mole percent yield of

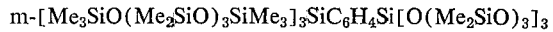

Calculated for $C_{60}H_{166}O_{26}Si_{26}$: 36.1% C, 8.2% H, 36.6% Si, $MR_D$=521.0, molecular weight=1999. Found: 35.9% C, 8.5% H, 35.9% Si, $MR_D$=522.2, molecular weight=1734.

The most important single property of branched siloxane polymers is their extremely low pour points or freezing points. This property appreciably extends the service temperature range of these materials. The pour points were obtained with a modified Beckman freezing point apparatus. The apparatus provided for liquid nitrogen as the coolant, a constant purge of argon over the sample, insertion of the thermocouple directly in the sample, and vigorous agitation of the sample by means of a hand operated wire stirrer. Pour points were determined on the fluids by continuously stirring the samples as they cooled, and taking temperature versus time readings at 1 minute intervals. In the region of the pour point, 30 sec. intervals were employed. The plateau on the time-temperature plot was taken as the lower limit of the pour point At this temperature the fluid could no longer be stirred. At least two cooling curves were run on each sample together with a melting curve determination to eliminate supercooling effects. The pour points of novel branched siloxane fluids and prior art linear siloxane fluids which served as controls are given in the table below. Generally, the data shows that the pour points of the novel branched fluids are substantially lower than those of linear dimethylsiloxane fluids of comparable 25° C. bulk viscosity.

TABLE.—POUR POINTS OF BRANCHED SILOXANE FLUIDS

| Structure | Pour Point, ° F. | Viscosity, cstks, 25° C. |
|---|---|---|
| $(MD_3O)_3SiCH_2CH_2Si(OD_3M)_3$ | −131 | 19.8 |
| m-$[(MD_3O)_3Si]_2C_6H_4$ | −126 | 22.6 |
| $(MD_3)SiC_6H_5$ | −139 | 9.0 |
| M D$_n$M "Control" | *−80 | 20.0 |
| M D$_n$M "Control" | *−120 | 7.0 |

M-$Me_3SiO_{1/2}$.
D-$Me_2SiO$.
*Fluids supercooled, values are melting points.

The novel branched siloxanes also have high temperature properties which are comparable to linear siloxane fluids. Branched fluids had flash points of 465–535° F. A fully stabilized linear dimethylsiloxane fluid has a flash point under similar conditions of about 500° F. in the same molecular weight range.

The novel branched organopolysiloxanes of the present invention can be used in any manner similar to prior organopolysiloxanes, such as in lubricating oils and in heat transfer fluids and the like. In addition to such prior art utility, the present novel compositions have superior low temperature properties which greatly extends the utility of the fluids prepared therefrom to such low temperatures.

What is claimed is:

1. A branched organopolysiloxane having a non-random, ordered structure and having the formula:

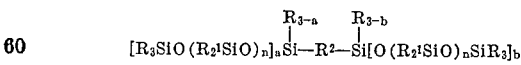

wherein R and $R^1$ are monovalent hydrocarbyl radicals, $R^2$ is a divalent radical selected from the class consisting of lower alkylene, phenylene and naphthylene radicals, $n$ is a number having a value of 0 to 21 inclusive, $a$ is an integer having a value of 0 to 3 inclusive, $b$ is an integer having a value of 0 to 3 inclusive, and the sum of $a+b$ is 3 to 6 inclusive.

2. A branched organopolysiloxane having a non-random, ordered structure and having the formula:

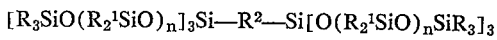

wherein R and $R^1$ are monovalent hydrocarbyl radicals, $R^2$ is a divalent hydrocarbyl radical selected from the class consisting of lower alkylene, phenylene and naphthylene radicals, and $n$ is a number having a value of 0 to 21 inclusive.

3. Branched organosiloxanes as claimed in claim 2 wherein R and $R^1$ are methyl radicals, $R^2$ is a lower alkylene radical and $n$ has a value of 1 to 6 inclusive.

4. Branched organosiloxanes as claimed in claim 2 wherein R and $R^1$ are methyl radicals, $R^2$ is a phenylene radical and $n$ has a value of 1 to 6 inclusive.

5. Branched organopolysiloxane having the formula:

$$[Me_3SiO(Me_2SiO)_3]_3SiCH_2CH_2Si[O(Me_2SiO)_3SiMe_3]_3$$

6. Branched organopolysiloxane having the formula:

$$m\text{-}[Me_3SiO(Me_2SiO)_3]_3SiC_6H_4Si[O(Me_2SiO)_3SiMe_3]_3$$

References Cited

UNITED STATES PATENTS

| | | | |
|---|---|---|---|
| 2,507,517 | 5/1950 | Clark | 260—448.2 |
| 2,507,518 | 5/1950 | Goodwin | 260—448.2 |
| 2,684,379 | 7/1954 | Guillissen et al. | 260—448.2 |
| 2,709,692 | 5/1955 | Gainer | 260—448.2 |
| 2,819,282 | 1/1958 | Clark | 260—448.2 |
| 3,032,528 | 5/1962 | Nitzsche et al. | 260—448.2 |
| 3,035,016 | 5/1962 | Bruner | 260—448.2 |
| 3,037,962 | 6/1962 | Hartung et al. | 260—448.2 |
| 3,105,061 | 6/1962 | Bruner | 260—448.2 |

OTHER REFERENCES

Andrianov et al.: "Izvestia Akad. Nauk, SSSR," 1961, pp. 1266–1269.

Pike: "Jour. Org. Chem.," vol. 26, January 1961, pp. 232–236.

TOBIAS E. LEVOW, *Primary Examiner.*

SAMUEL H. BLECH, *Examiner.*

P. F. SHAVER, *Assistant Examiner.*